(12) United States Patent
Lydecker et al.

(10) Patent No.: US 8,736,961 B2
(45) Date of Patent: May 27, 2014

(54) COLOR CORRECTION OF DAYLIGHT

(75) Inventors: Stephen H. Lydecker, Snellville, GA (US); Jack C. Rains, Jr., Herndon, VA (US); David P. Ramer, Reston, VA (US)

(73) Assignee: ABL IP Holding LLC, Conyers, GA (US)

( * ) Notice: Subject to any disclaimer, the term of this patent is extended or adjusted under 35 U.S.C. 154(b) by 0 days.

(21) Appl. No.: 13/464,657

(22) Filed: May 4, 2012

(65) Prior Publication Data
US 2013/0293963 A1  Nov. 7, 2013

(51) Int. Cl.
*F21S 11/00* (2006.01)
*E04D 13/03* (2006.01)

(52) U.S. Cl.
CPC ............. *F21S 11/00* (2013.01); *E04D 13/033* (2013.01); *E04D 2013/0345* (2013.01); *Y02B 10/20* (2013.01)
USPC ........................................... 359/591; 52/200

(58) Field of Classification Search
CPC ...................................................... F21S 11/00
USPC ................................. 362/234; 359/591–593
See application file for complete search history.

(56) References Cited

U.S. PATENT DOCUMENTS

| | | | | |
|---|---|---|---|---|
| 2,959,701 | A * | 11/1960 | Marzocchi et al. | 313/483 |
| 4,539,625 | A * | 9/1985 | Bornstein et al. | 362/576 |
| 4,884,860 | A * | 12/1989 | Brown | 385/27 |
| 5,662,831 | A * | 9/1997 | Chadha | 252/301.4 R |
| 6,130,781 | A * | 10/2000 | Gauvin | 359/591 |
| 6,299,317 | B1 * | 10/2001 | Gorthala | 359/853 |
| 6,299,338 | B1 * | 10/2001 | Levinson et al. | 362/559 |
| 6,375,864 | B1 * | 4/2002 | Phillips et al. | 252/301.33 |
| 6,419,855 | B1 * | 7/2002 | Keszler et al. | 252/301.5 |
| 7,395,636 | B2 * | 7/2008 | Blomberg | 52/200 |
| 7,501,092 | B2 * | 3/2009 | Chen | 422/53 |
| 7,736,014 | B2 | 6/2010 | Blomberg | |
| 2002/0085393 | A1 * | 7/2002 | Eisenman et al. | 362/576 |
| 2003/0126811 | A1 * | 7/2003 | Van Dame | 52/200 |
| 2005/0128728 | A1 * | 6/2005 | Eisenman et al. | 362/1 |
| 2005/0281030 | A1 * | 12/2005 | Leong et al. | 362/234 |
| 2006/0140240 | A1 * | 6/2006 | Chen | 372/69 |
| 2012/0042868 | A1 * | 2/2012 | Huang | 126/570 |

OTHER PUBLICATIONS

T.R. Hamzah et al., "Light Pipes: An Innovative Design Device for Bringing Natural Daylight and Illumination into Buildings with Deep Floor Plan (Patent Applied)," Far Eastern Economic Review Asian Innovation Awards 2003.

* cited by examiner

*Primary Examiner* — Clayton E Laballe
*Assistant Examiner* — Kevin Butler
(74) *Attorney, Agent, or Firm* — RatnerPrestia

(57) ABSTRACT

The present application generally relates to techniques and equipment for color correction of natural daylight. More particularly, the present application relates to color correction of daylight entering the interior of a structure to maintain a substantially constant color temperature over a period of time through deployment of an opto-luminescent material in a daylighting device. The color correction through deployment of an opto-luminescent material and/or color filter in a daylighting device preferably maintains high lumen intensity.

33 Claims, 19 Drawing Sheets

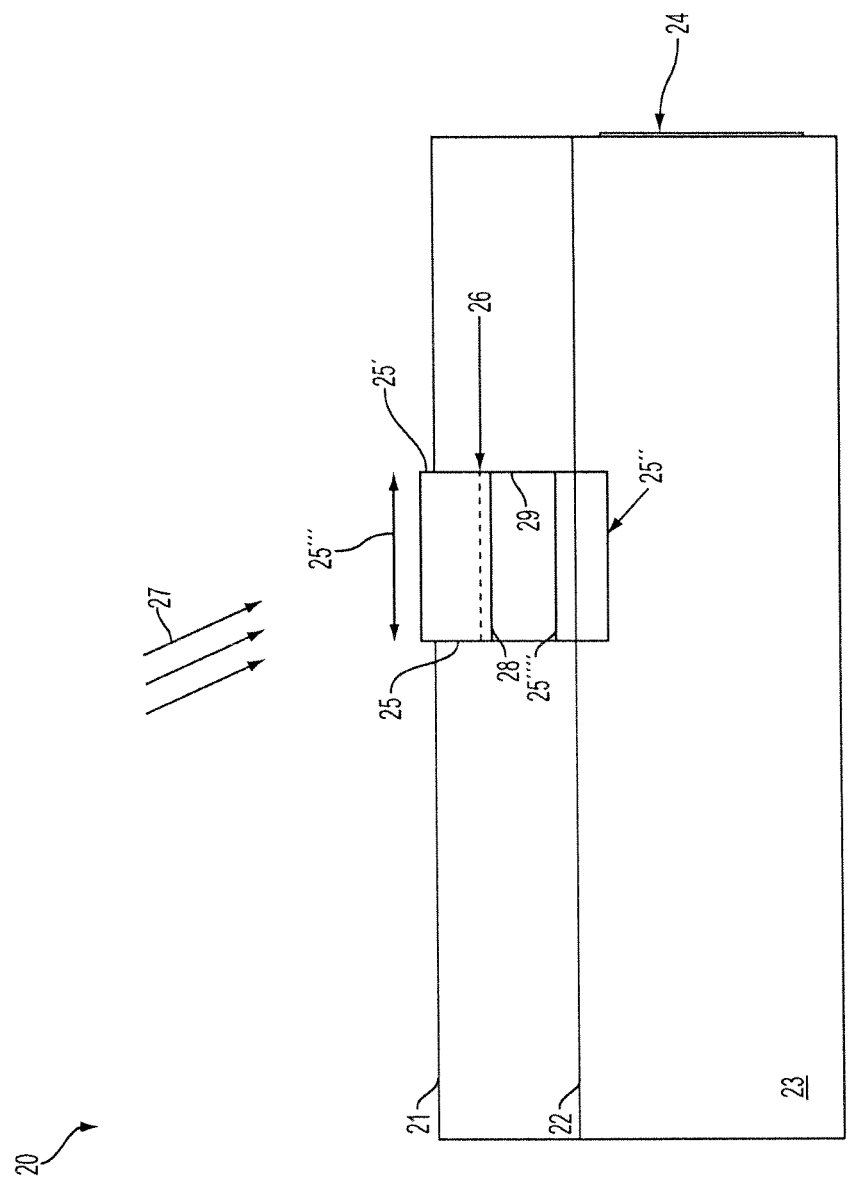

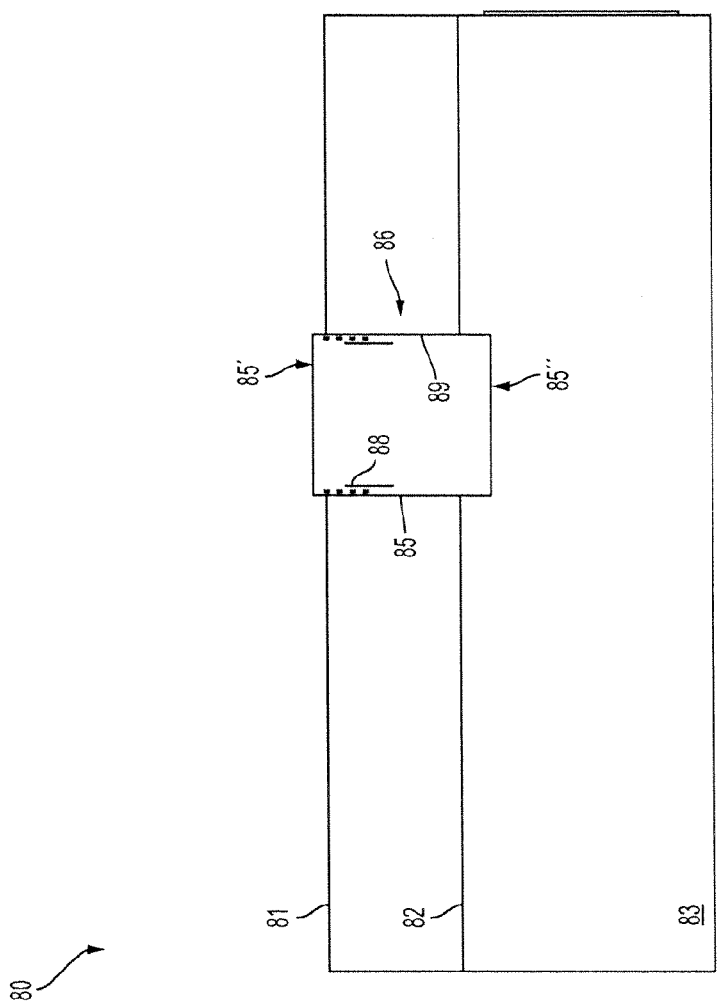

COLOR CORRECTION OF DAYLIGHT

TECHNICAL FIELD

The present subject matter generally relates to techniques and equipment for color correction of natural daylight. More particularly, the present application relates to color correction of daylight entering the interior of a structure having a daylighting device to maintain a substantially constant color temperature over a period of time through deployment of an opto-luminescent material.

BACKGROUND

Conventional windows and skylights are inserted into walls or roofs of buildings to introduce natural light into the interior of a building to offset the need for artificial light. Existing windows and skylights allow for outside natural light to penetrate to the inside of a building during daylight hours. The color temperature of natural light penetrating through a window or skylight changes over the course of a day, season or due to changes in weather conditions (overcast vs. cloudless sky). Existing windows and skylights, however, do not have the ability to change a color temperature of the natural light entering the interior of a building to a more desired color temperature.

As shown in FIG. 1, a typical building 10 includes a roof 11 exposed to the exterior of the building 10. A ceiling 12 and a room 13 are present within the interior of the building 10. A skylight 15 is positioned in the roof 11 and extends through the building 10 and ceiling 12 to the interior of room 13. The exterior entrance 15' of the skylight 15 is positioned to receive natural daylight 17 and pass the natural light to the interior of room 13 and thereby supply illumination 15" the interior of room 13. Similarly, a window 14 is positioned on a side of building 10 for passing natural light to the interior of room 13. Structures of skylights are know. For example, the skylight can be substantially flush with the roofline with a vaulted ceiling. Other skylights extend downward into a room having a drop down ceiling and include a reflective surface to carry light into the room. These are but a few examples of conventional skylight structures.

Consumers typically prefer the daylight of the morning or late afternoon hours, due to the presence of a "warmer" red coloration. A desirable color temperature during a time period in the morning or late afternoon hours is in the range of about 3,000 to 3,500° K depending on local weather conditions. Over the course of the day, the color temperature increases to around 5,600° K at midday depending on local weather conditions. This midday light is characterized as "cooler" light (despite actually having a higher color temperature than morning light) due to the presence of more blue and green colors present in the light. Thus, the higher color temperature of midday light is less preferred by consumers than the lower color temperature of morning light (e.g., near sunrise) or later afternoon (e.g., near sunset).

Hence a need exists for techniques and equipment for color correction of day light that maintains a substantially constant color temperature over a period of time such as the course of a day or season or due to changes in weather conditions, and preferably maintains high lumen intensity at the same time.

SUMMARY

The teachings herein alleviate one or more of the above noted problems of the prior art with improved daylighting devices.

An exemplary daylighting device includes a passive optical element, that is at least substantially transmissive with respect to daylight. The passive optical element is configured to receive daylight from outside a structure and allow passage of light to an interior of the structure. An opto-luminescent material is associated with the passive optical element. The opto-luminescent material has excitation and emission spectra so as to convert a first portion of daylight in a first spectral region to light in a second spectral region. At least some of the light in the second spectral region produced by excitation of the opto-luminescent material is emitted into the interior of the structure in combination together with a second portion of daylight through the passive optical element.

In other examples, a daylighting method is provided. The method includes receiving daylight from outside a structure, for transmission through a passive optical element that is at least substantially transmissive and color neutral with respect to daylight toward an interior of the structure. An opto-luminescent material is excited with a first portion of the received light in a first spectral region to convert the first portion of the light into light in a second spectral region. A combination of at least some of the light is supplied in the second spectral region produced by the excitation of the opto-luminescent material and a second portion of the received light, through the passive optical element, into the interior of the structure. The opto-luminescent material is of a type such that the light conversion and combination results in a reduced variation in color characteristic of light supplied through the device into the interior of the structure due to conditions or variations over time in the color characteristic of the daylight.

In yet another example, a system which includes a daylighting device is provided. The daylighting device includes an optical collector for receiving daylight from outside a structure. An optical emitter element is configured to allow passage of light to an interior of the structure. An optical channel is coupled to and configured to carry light from the optical collector to the optical emitter element. An opto-luminescent material is in or coupled to the daylighting device. The opto-luminescent material has excitation and emission spectra so as to convert a first portion of daylight received by the system in a first spectral region to light in a second spectral region. The opto-luminescent material is positioned so that at least some of the light in the second spectral region produced by excitation of the opto-luminescent material is emitted into the interior of the structure in combination together with a second portion of the received daylight.

In yet other examples, a color filter is present in conjunction with or, as an alternative to, the opto-luminescent material in the daylighting devices and systems described herein.

Additional advantages and novel features will be set forth in part in the description which follows, and in part will become apparent to those skilled in the art upon examination of the following and the accompanying drawings or may be learned by production or operation of the examples. The advantages of the present teachings may be realized and attained by practice or use of various aspects of the methodologies, instrumentalities and combinations set forth in the detailed examples discussed below.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 2 shows an example of a daylighting device in a roof of a structure.

FIG. 8 is a view of another example of a daylighting device in a roof of a structure.

DETAILED DESCRIPTION

Figure 1:
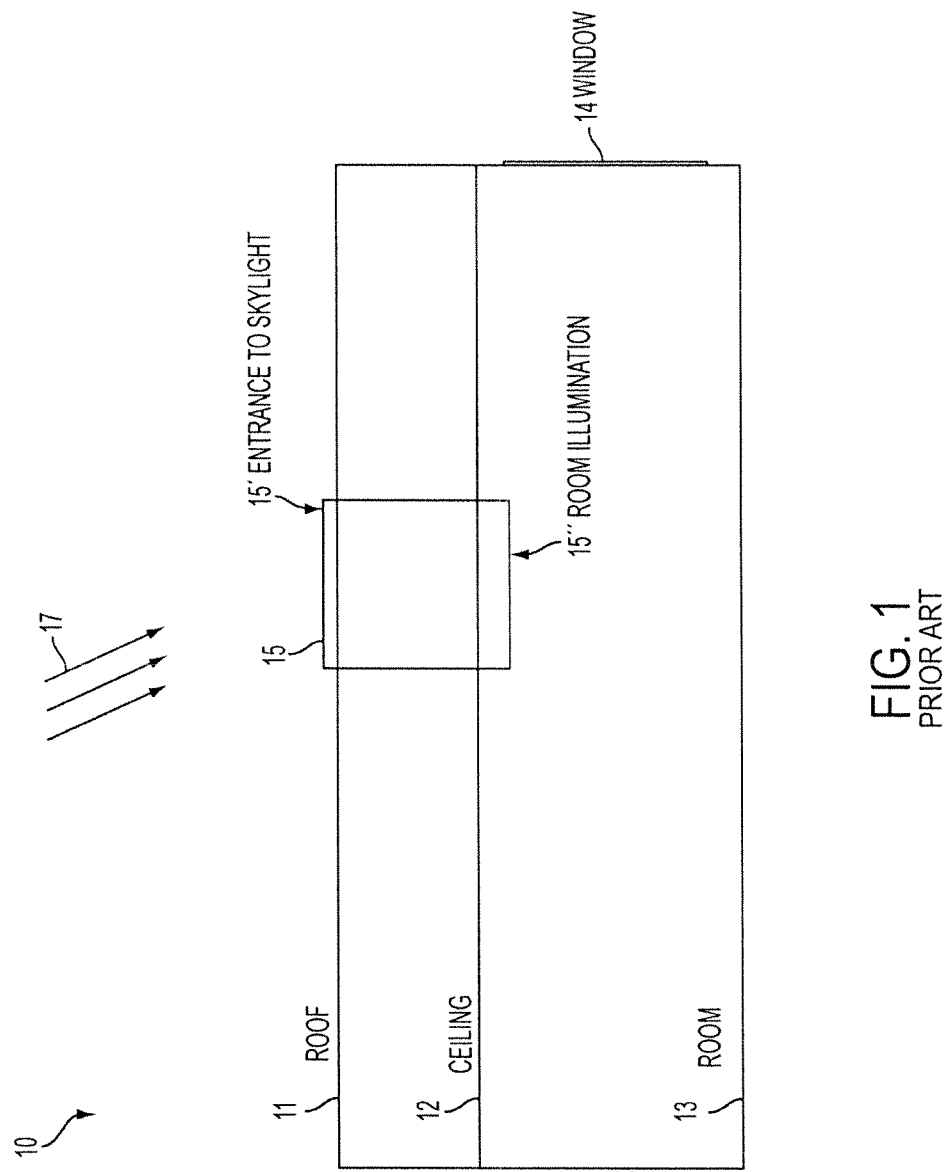
FIG. 1 shows an illustration of a building with a conventional skylight and window.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and circuitry have been described at a relatively high-level, without detail, in order to avoid unnecessarily obscuring aspects of the present teachings.

Reference now is made in detail to the examples illustrated in the accompanying drawings and discussed below. FIG. 2 illustrates an example of a daylighting device 25 positioned within a roof 21 (pitched or flat roof) of a structure 20 and extending through the ceiling 22 of the structure 20 and into interior room 23. The daylighting device in FIG. 2 can be one of any number of skylights in the structure 20.

The structure depicted in one or more of the examples includes a building. It should be understood that a building can be a commercial, agricultural (e.g., green house or a farming structure) or a residential structure. The structure can also include a motorized vehicle such as a boat, ship, recreational vehicle (RV), etc. For daylighting devices used for agricultural purposes, it may be desirable to color correct the daylight into a color light that is a preferred color for growing vegetation or crops or stimulating the production of milk in dairy cows.

An exterior surface 25' of the daylighting device 25 serves as the entrance to the light entering the daylighting device 25. The exterior surface 25' receives daylight 27 from outside the structure 20, and the device 25 is configured to allow passage of light to the interior of structure 20 and provides illumination 25" to interior room 23. The daylighting device 25 is a passive optical system that is at least substantially transmissive and color neutral with respect to daylight received from outside the building for processing in and/or transport to the room 23 inside the building. For example, the optical element of the device 25 forming the surface 25' and/or the optical element forming the light exist from the device 25 into the room 23 are relatively transparent, at least in this example. As a result, these elements and the overall device 25 would normally produce little or no color shift of light received by and passing through the device 25.

To this point in our discussion, the device 25 of this first example is fairly similar to the skylight 15 in FIG. 1. The daylighting device 25, however, further includes a structure 28 that bears an opto-luminescent material 26 associated with the exterior surface 25'. The opto-luminescent material 26 has excitation and emission spectra so as to convert a first portion of light 27 through the exterior surface in a first spectral region to light in a second spectral region. The structure 28 is configured so that at least some of the light in the second spectral region produced by excitation of the opto-luminescent material 26 is emitted into the interior of the building in combination together with a second portion of the light passing 27 which passes through the exterior surface 25' and the rest of the device 25.

In certain examples, the opto-luminescent material 26 that is present in the daylighting devices described herein is of a type such that the light conversion and combination results in a reduced variation in color characteristic of light supplied through the device into the interior of the building due to conditions (i.e. outside weather conditions) or variations over time in the color characteristic of the daylight. The opto-luminescent material is preferably colorless when it is in its non-excited/non-pumped state.

In certain examples, the opto-luminescent phosphor is present such that afternoon light in a color temperature range of about 5,000 to 5,600° K is converted down to a more desirable temperature, e.g., in the 3,000 to 3,500° K range similar to a color temperature of a morning light near sunrise or late afternoon light near sunset. Again, depending on the desired range of color temperature, the phosphor(s) used in the daylighting devices described herein can be selected and mixed (if more than one phosphor is used) to achieve any desired color temperature. Several of the examples described herein convert the cooler blue and green light of the afternoon light into a warmer red coloration which is more typical of morning light. Again, any desired color temperature can be achieved with the present examples.

An example of an opto-luminescent material for one or more of the daylighting systems and devices described herein is one or more phosphor materials. An opto-luminescent "phosphor," as used in this and several other examples, may be any of a variety of optically excited luminescent materials. Phosphorescent, biophosphorescent or bioluminescent materials can also be used as opto-luminescent materials. Terms relating to opto-luminescent phosphor are intended to encompass a broad range of materials excited by optical energy of a first or 'excitation' region/band that re-generate light in a different second or 'emission' region/band that is at least somewhat different from the excitation band/region. Examples of phosphors that may be used in various applications discussed herein include a variety of conventional phosphors. Traditional phosphors such as rare-earth phosphors may be used. Recently developed quantum dot (Q-dot) phosphors or doped quantum dot (D-dot) phosphors may also be used.

Phosphors absorb excitation energy then re-emit the energy as radiation of a different wavelength than the initial excitation energy. For example, some phosphors produce a down-conversion referred to as a "Stokes shift," in which the emitted radiation has less quantum energy and thus a longer wavelength. Other phosphors produce an up-conversion or "Anti-Stokes shift," in which the emitted radiation has greater quantum energy and thus a shorter wavelength.

Quantum dots (Q-dots) provide similar shifts in wavelengths of light. Quantum dots are nano scale semiconductor particles, typically crystalline in nature, which absorb light of one wavelength and re-emit light at a different wavelength, much like conventional phosphors. However, unlike conventional phosphors, optical properties of the quantum dots can be more easily tailored, for example, as a function of the size of the dots. In this way, for example, it is possible to adjust the absorption spectrum and/or the emission spectrum of the quantum dots by controlling crystal formation during the manufacturing process so as to change the size of the quantum dots. Thus, quantum dots of the same material, but with different sizes, can absorb and/or emit light of different colors. For at least some exemplary quantum dot materials, the larger the dots, the redder the spectrum of re-emitted light; whereas smaller dots produce a bluer spectrum of re-emitted light.

Doped quantum dot (D-dot) phosphors are similar to quantum dots but are also doped in a manner similar to doping of a semiconductor. Also, Colloidal Q-Dots are commercially available from NN Labs, LLC of Fayetteville, Ark. and are based upon cadmium selenide. Doped Q-dots are commercially available from NN Labs of Fayetteville, Ark. and are based upon manganese or copper-doped zinc selenide. Other commercially available phosphors that can be formed into a sheet are available from Intematix of Fremont, Calif. EMD Chemicals, of Gibbstown, N.J., manufactures powder phosphors that can be used in one or more examples described herein.

Figure 13A:
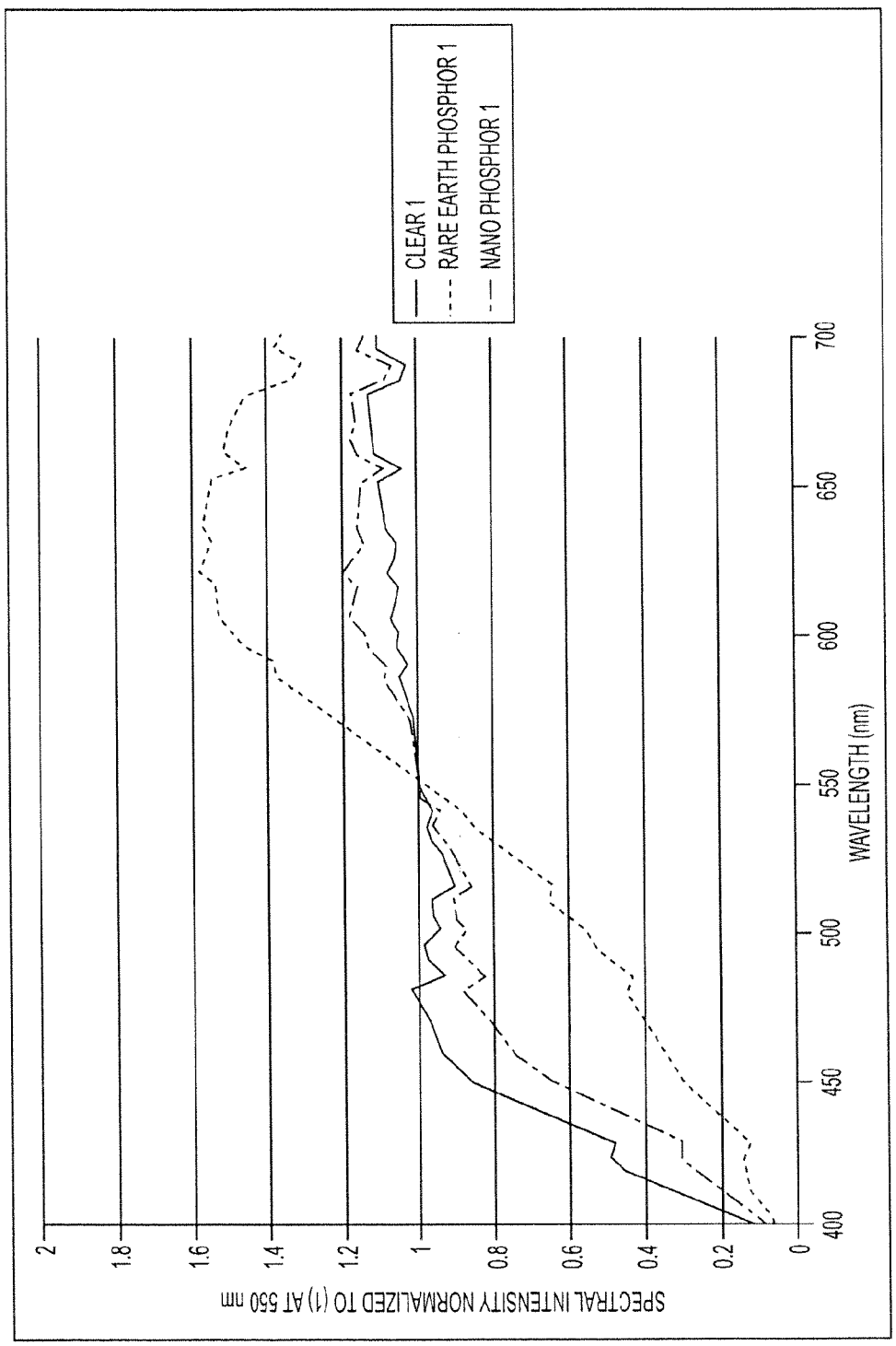
FIG. 13A-13C show data from several tests of different opto-luminescent materials during different times of the day.
Figure 13B:
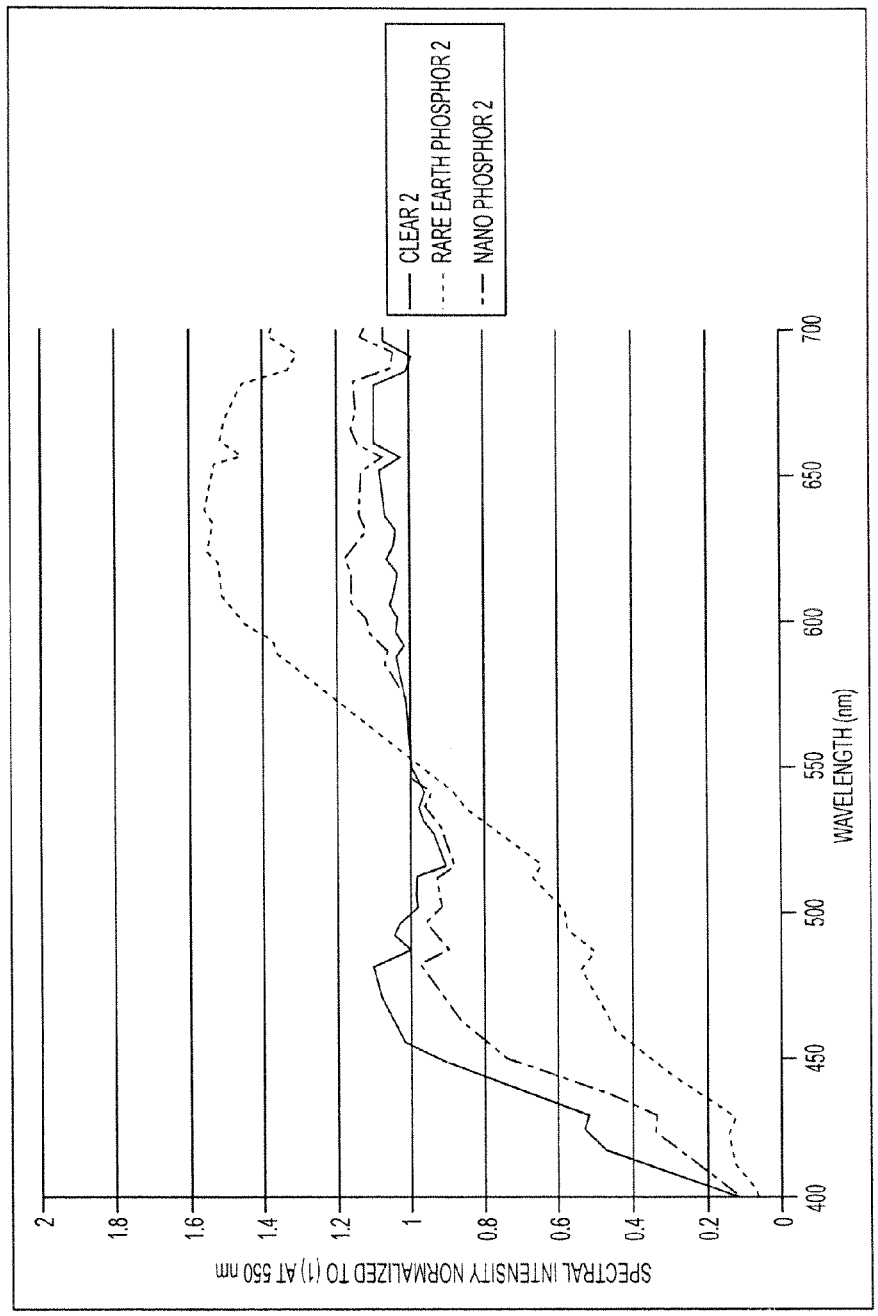
Figure 13C:
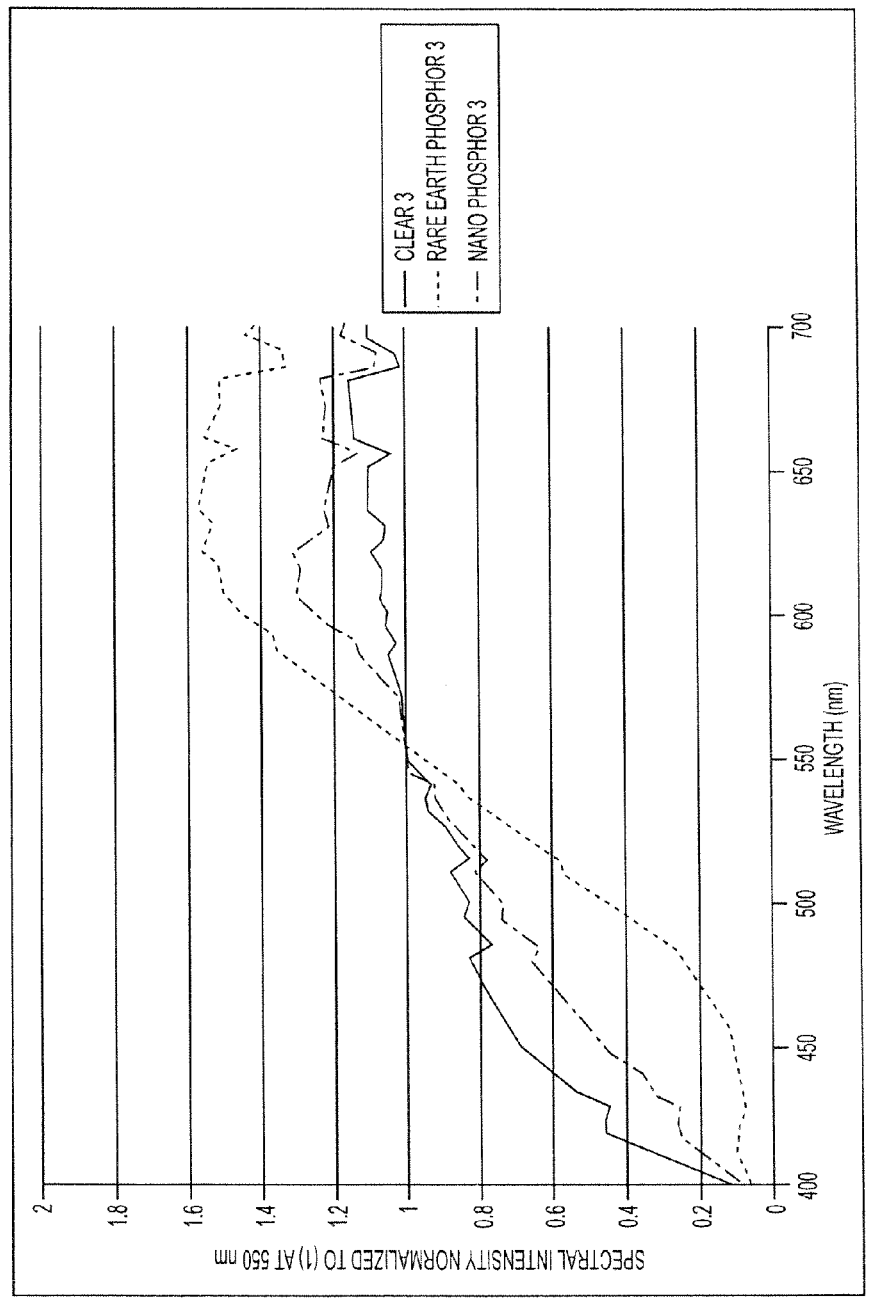

As shown in FIGS. 13A-13C, specific opto-luminescent phosphor materials were applied to a transparent material such as glass or plastic. A control glass or clear glass containing no opto-luminescent material was also tested. In particular, a rare earth phosphor (available from Intematix) and a nano-phosphor (available from NN Labs, LLC) were applied as to either a transparent plastic or glass sample. The rare earth phosphor was applied as a film to a transparent plastic sample. The nano-phosphor was combined with a binder and positioned between two glass plates. FIG. 13A represents a first test performed at 1:00 pm; FIG. 13B represents a second test performed at 2:00 pm; and FIG. 13C represents a third test performed at 4:00 pm. Tables 1-3 below represent data test results for the three tests performed at 1, 2 and 4:00 pm, respectively. Values for Correlated Color Temperature (CCT), Duv (the closest distance from the Plankian locus (the black body locus)), Color Rendering Index average (CRI Ra), and red rendering index (R9) for measuring a red balance were each measured. The spectral intensity was normalized to 550 nm for the testing. Visible light in the range of 400-700 nanometers is represented in FIGS. 13A-13C.

TABLE 1

Test 1

|  | Clear Glass 1 | Rare Earth Phosphor 1 | Nano-Phosphor 1 |
| --- | --- | --- | --- |
| CCT: | 4583 | 2756 | 3962 |
| Duv: | 0 | 0.004 | 0.002 |
| CRI Ra: | 96 | 92 | 96 |
| R9: | 91 | 62 | 97 |

TABLE 2

Test 2

|  | Clear Glass 2 | Rare Earth Phosphor 2 | Nano-Phosphor 2 |
| --- | --- | --- | --- |
| CCT: | 4832 | 2826 | 4143 |
| Duv: | −0.002 | 0.001 | 0 |
| CRI Ra: | 95 | 93 | 95 |
| R9: | 84 | 68 | 96 |

TABLE 3

Test 3

|  | Clear Glass 3 | Rare Earth Phosphor 3 | Nano-Phosphor 3 |
| --- | --- | --- | --- |
| CCT: | 4728 | 2756 | 3860 |
| Duv: | −0.004 | 0.004 | −0.004 |
| CRI Ra: | 93 | 92 | 93 |
| R9: | 76 | 62 | 89 |

The test data in the spectral charts of FIGS. 13A-13C reveal that both the rare earth and nano-phosphors are an effective way of changing the color temperature of daylight. In particular, both phosphors were able to convert some of the blue light (wavelength of about 475) content into a warmer red (about 650 nm) or orange (about 590 nm) throughout the afternoon. Although the clear glass control likely absorbed some blue light, this fact does not change the conclusions that opto-luminescent materials such as phosphors are an effective way of changing the color temperature of natural light entering a daylighting device for illumination of interior spaces in a structure such as a building. In the experiment, clear glass absorbed some of the blue light and changed some of the control quantities such as CCT.

The opto-luminescent phosphor material is preferably colorless when it is in its non-excited state. In one example, the phosphor used in the daylighting device will be in a substantially non-excited state during the morning hours near sunrise or later afternoon hours near sunset when the content of the outside light has a "warmer" red coloration. As the day passes on, the red light that remains in the light will continue to pass through without exciting the phosphor, but the blue and green light that becomes more prevalent in the afternoon light will be converted into a more acceptable color temperature by the opto-luminescent phosphor. Similarly, conditions such as cloud cover (overcast conditions) will effect the amount of blue green light in the daylight and will need color correction accordingly.

D-dots are examples of opto-luminescent phosphors that tend to be colorless when they are not in an excited state. When used in the daylighting device, D-dots mat be used that are primarily excited with ultraviolet (UV) or near UV light. Thus, outdoor light that enters the daylighting device contains UV and near UV light (including purple and blue hues) will pump or excite the D-dots so as to convert some of the UV and near UV light into a visible light of a more acceptable color temperature such as a reddish orange. The D-dots therefore will down convert the UV and near UV light into a more acceptable color temperature of visible light that illuminates the interior of the room. D-Dots may increase the apparent light throughput of the daylighting device by converting the UV light into light of a visible range. The D-dots will not interfere with other light in the visible range, which therefore and will pass through the daylighting device into the interior of the room. Similarly, other phosphors can be used to convert some infrared light into light in the visible spectrum with a more desirable color temperature.

Opto-luminescent materials can be deployed in or around the daylighting device in a myriad of ways. Turning back to the example in FIG. 2, the opto-luminescent material 26 can be included in or on a film or sheet to form opto-luminescent structure 28. The example of the daylighting device can be, for example, a conventional skylight structure as discussed above for FIG. 1. The film/sheet opto-luminescent structure 28 containing the opto-luminescent material 26 can be positioned inside the daylighting device between the roof 21 and ceiling 22 and except for the phosphor is transparent or translucent to daylight. Commercially available phosphors that can be formed into a sheet are available from Intematix of Fremont, Calif. The opto-luminescent structure could alternatively be a plate of transparent glass or acrylic coated with a phosphor(s). For example, a phosphor(s) powder can be electrostatically deposited on the glass or acrylic/plastic plate. Other techniques include doping the phosphor into a transparent substrate or applying a phosphor containing paint or powder coat on a transparent substrate.

The position of the opto-luminescent structure 28 can be at other locations within the daylighting device 25. For instance, if the film or sheet containing the opto-luminescent material is colorless, it can be positioned at the entrance 25' of the daylighting device or at the light exit of the device 25 into the room 23. If however, the sheet or film has an orange coloration, as is common with some types of phosphors, it may be preferable to locate the opto-luminescent structure 28 within the daylighting device 25 at a less visible position due to aesthetic reasoning and/or local zoning regulations.

In certain examples, a color filter 25''' (FIG. 2) can be used in conjunction with, or as an alternative to, the opto-luminescent material. Color filters are commercially available and are configured to filter, reflect or absorb light by wavelength range. For example, color absorption filters are made from colored filter glass or synthetic gels. If included, an optical grade filter having a uniform density and color over the surface of the filter is preferably used. Also, the thicker the material of the filter, the more wavelengths it will absorb. By absorbing certain wavelengths, only certain parts of the visible spectrum can be seen. If for example a filter that is meant to absorb all other wavelengths except yellow is used, only yellow light will come through and be seen inside the room 23. Further, if it is desirable to remove a particular color(s) from the natural light entering the daylighting device, the color filter can be added to filter out such unwanted light and allow the remaining wavelengths of light to pass through. If a red colored filter is used, for example, unwanted blue or green colors can be filtered out of the light. In the examples of FIGS. 2-10, a color filter can be used in conjunction with the opto-luminescent material or as an alternative to the opto-luminescent material. As discuss in further detail below, the microlouver material 78 in FIGS. 7A, 7B, could include the color filter material without the opto-luminescent material present. For reflective filters, these type filters can be used to reflect UV and/or blue and green light back into the opto-luminescent material for further color correction.

Returning again to the example in FIG. 2, the inner surfaces 29 of the daylighting device 25 may be reflective, e.g. specular, quasi-specular or diffusely reflective, to minimize loss of light due to absorption or back out of the entrance 25' of the daylighting device 25. The inner surfaces 29, for example, can include a specular mirror surface such as mirrored silver. The mirrored surface will reflect the light and act as an optical channel to direct the received light through towards the interior room 23. The daylighting device can optionally include a collector 25' for enhancing collection of light 27. The collector 25''' can be flat or shaped. The collector illustrated in the example of FIG. 2 is a dome shaped structure.

Figure 3A:
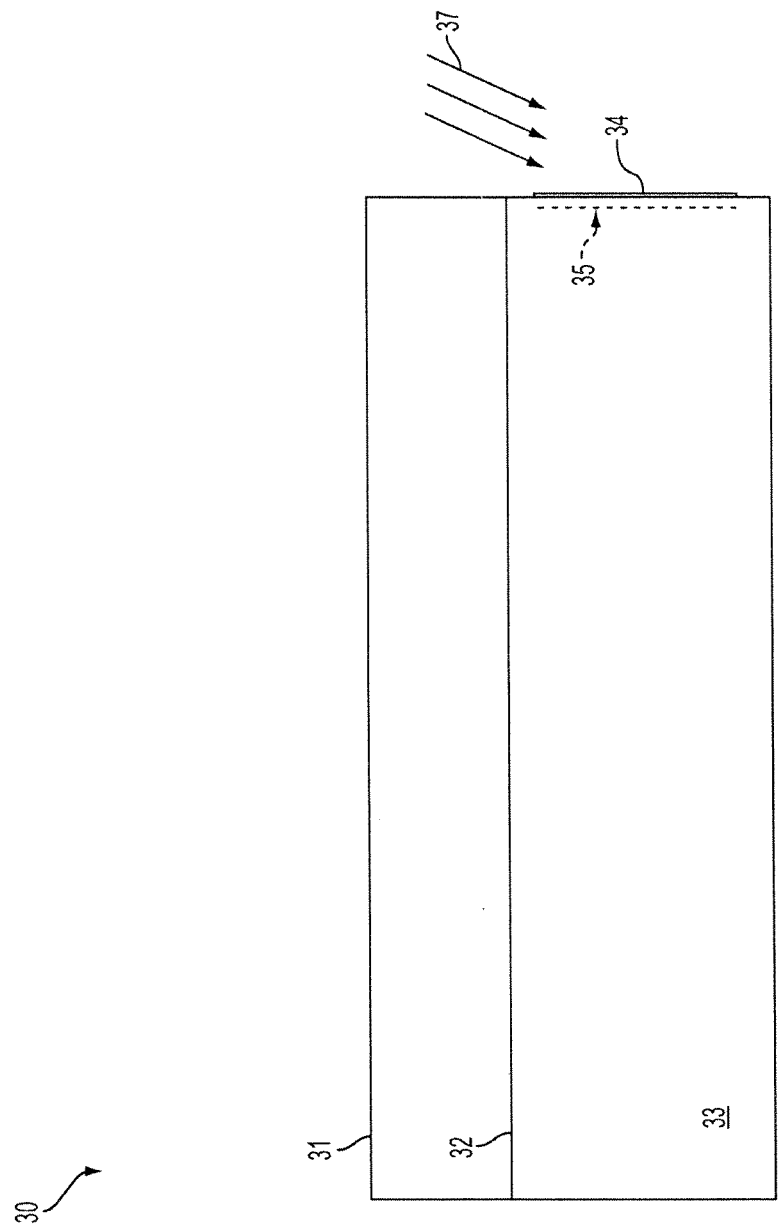
FIG. 3A shows an example of a daylighting device in a side of a structure.

In the example shown in FIG. 3A, the window 34 includes a window dressing such as a shade 35 containing an opto-luminescent material. The opto-luminescent material can include one or more of the phosphors described above. The shade could be a transparent or semitransparent fabric with a phosphor coating on or embedded in the fabric; or the fabric can be stained with an opto-luminescent dye(s). Any conventional window dressing (blind, curtain, etc.) coated with one or more opto-luminescent materials is contemplated. As with the example in FIG. 1, the shade 35 will perform in substantially the same manner and, for example, down convert at least some of the bluish early afternoon light 37 entering window 34 into a warmer reddish light to illuminate interior room 33. The roof 31 and ceiling 32 are depicted for reference points in building 30.

Figure 3B:
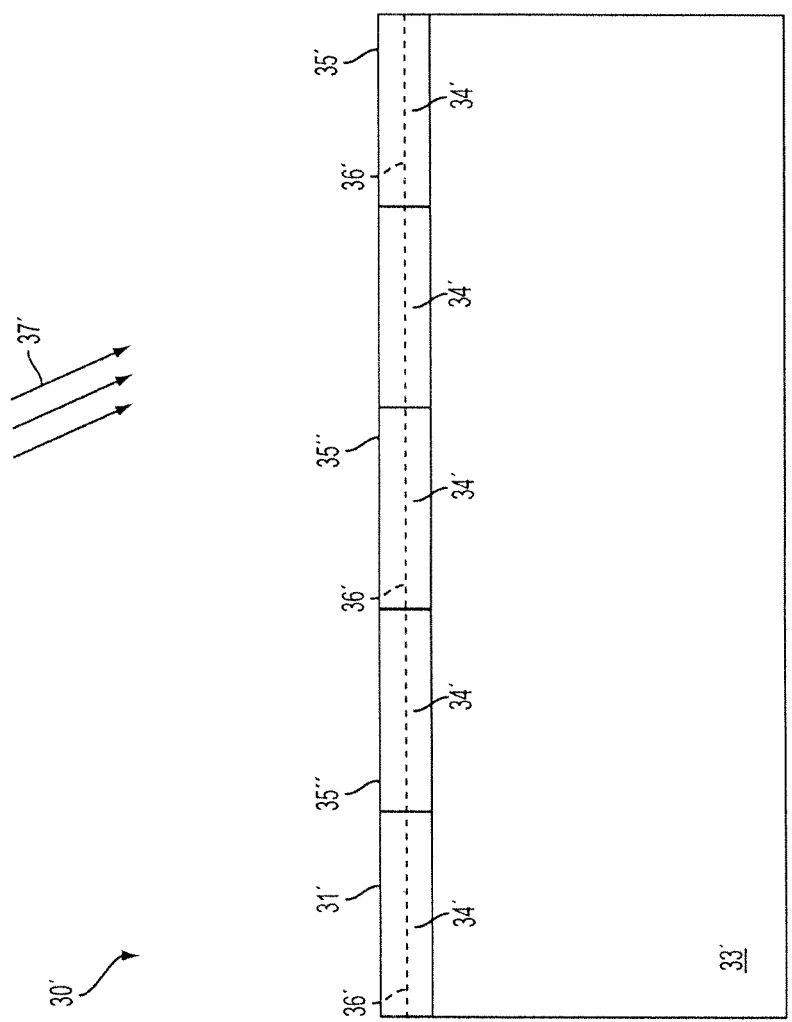
FIG. 3B shows an example of a daylighting device in a roof of a structure.

Alternatively, the daylighting device 35' can be a roof 31' for a sun-room 30', as shown in FIG. 3B. The roof 31' for sun-room 30' could essentially comprise a plurality of connected windows 34' serving as a roof 31' for the sunroom 30', wherein each window 34' of the roof 32' of the sun-room 30' has an opto-luminescent material 36' coated, impregnated or doped into each window 34', or present in a film or sheet adjacent to or in contact with each window 34' comprising the sun-room roof 31'. As with the previous examples, the daylighting device 35' containing the opto-luminescent material 36' will perform in substantially the same manner and, for example, down convert at least some of the bluish early afternoon light 37' entering at entrance 35'' of each window 34' into a warmer reddish light to illuminate interior room 33'.

Figure 4A:
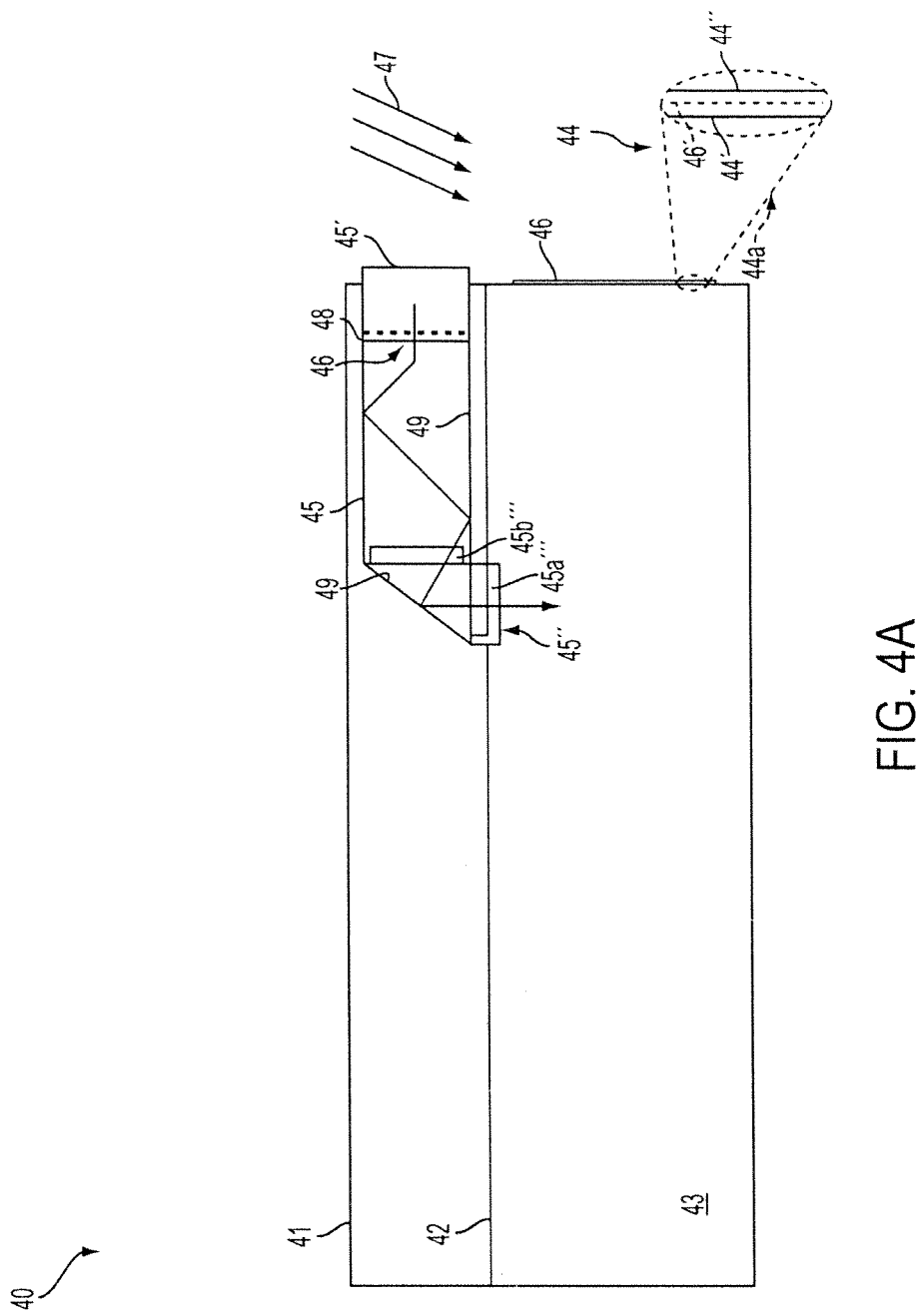
FIGS. 4A-4B show examples using a tunnel-shaped daylighting device.

Turning now to FIG. 4A, an example of a building 40 containing another daylighting device 45 is depicted. In the example of FIG. 4A, the daylighting device 45 is positioned between the roof 41 and the ceiling 42. The entrance 45' of the daylighting device 45 is positioned on a side of the building 40. The daylighting device 45 in the example extends horizontally from the side of the building to a desired position in the ceiling 42. Somewhat different or angled orientation of the device may be used. The tunnel shaped daylighting device 45 allows light 47 to enter the daylighting device and follow the path of the directional arrow into interior room 43. The inner surfaces 49 of the daylighting device 45 may be reflective, e.g. specular, quasi-specular or diffusely reflective, to minimize losses as outlined earlier. The daylighting device 45 in this example includes prism or mirror members 45a''' and 45b''' at or near the interior end of the light channel formed within the device 45. The daylighting device 45 allows for the light entering the daylighting device 45 to travel along a direction between the roof and ceiling until it reaches the prism or mirror members 45a''' and 45b''', which alter the direction of the light and direct it into the room 43 to illuminate 45'' the interior of room 43. Such prism or mirror designed daylighting devices are commercially available and can often referred to as a "solar pipe", "light pipe", "light tube" or "tubular skylight." These prism or mirror designed daylighting devices are designed to bring natural daylight and illumination horizontally into a building with a deep floor plan.

The opto-luminescent material 46 performs in substantially the same manner as in the example in FIG. 2. The daylighting device 45 includes an opto-luminescent structure 48 for bearing an opto-luminescent material 46 associated with the exterior surface 45'. The opto-luminescent material 46 has excitation and emission spectra so as to convert a first portion of light 47 in a first spectral region to light in a second spectral region. Thus, at least some of the light transported to the left of the depicted opto-luminescent structure 48 will contain light in a second spectral region. The opto-luminescent structure 48 is configured so that at least some of the light in the second spectral region produced by excitation of the opto-luminescent material 46 is emitted into the interior of the building 40 in combination together with a second portion of the light (i.e., non-excited light) passing through the exterior surface entrance 45'.

The window 44 in FIG. 4A, can optionally include a window dressing (not shown) having an opto-luminescent material as discussed in the example of FIG. 3A and/or the opto-luminescent material 46 can be included in the material (glass, acrylic, plastic, etc.) of window 44. In particular examples, the opto-luminescent material 46 can be a coating on the window 44, impregnated or doped into the window 44, or present as a gas 46' between two sealed panels 44', 44" forming the window 44a (see enlarged view in FIG. 4A).

Figure 4B:
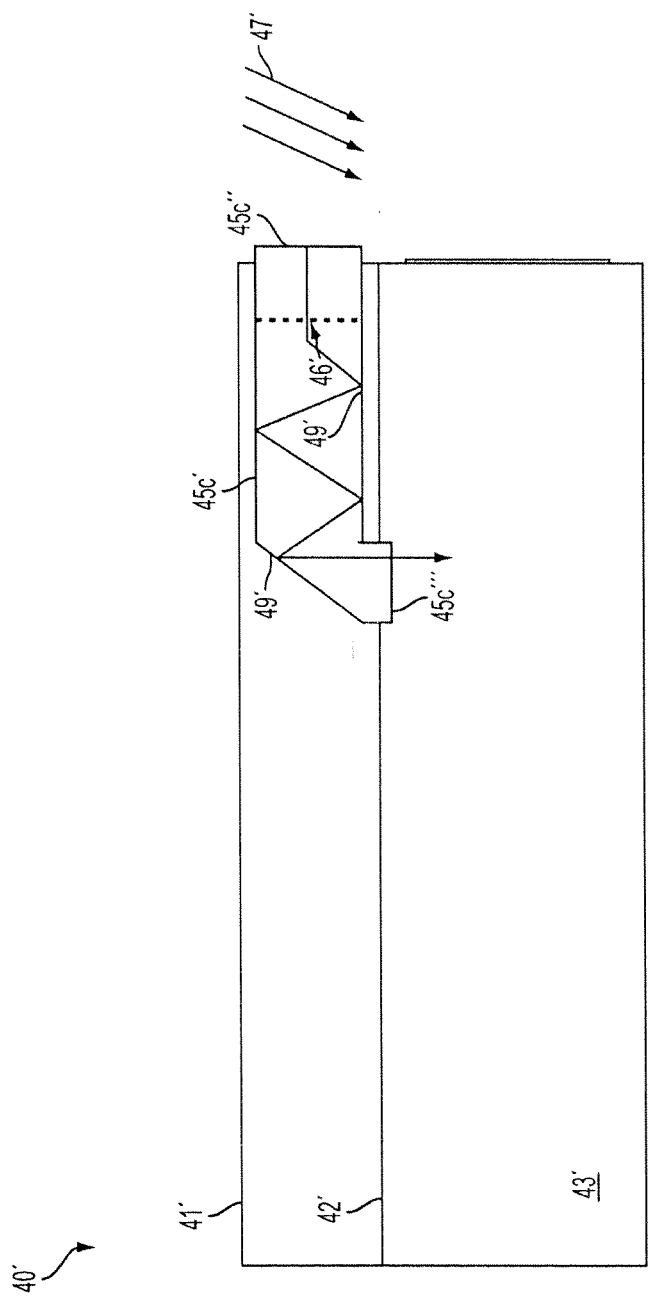

FIG. 4B is an example of a building 40' containing another daylighting device 45c' is depicted. The example of FIG. 4B is substantially similar to that in FIG. 4A, but no directional mirrors or prisms (or other optical devices) are included in this example. In the example of FIG. 4B, the daylighting device 45c' is positioned between the roof 41' and the ceiling 42'. The entrance 45c" of the daylighting device 45c' is positioned on a side of the building 40'. The daylighting device 45c' in the example extends horizontally from the side of the building 40' to a desired position in the ceiling 42'. Somewhat different or angled orientation of the device may be used. The tunnel shaped daylighting device 45c' allows light 47' to enter the daylighting device 45c' and follow the path of the directional arrow into interior room 43'. The inner surfaces 49' of the daylighting device 45c' may be reflective, e.g. specular, quasi-specular or diffusely reflective, to minimize losses as outlined earlier. The inner surfaces 49' of this example are sufficiently reflective to pass light through the daylighting device from the entrance 45c" to the exit into interior room 43' to provide illumination 45c'" to the room 43'.

Figure 5:
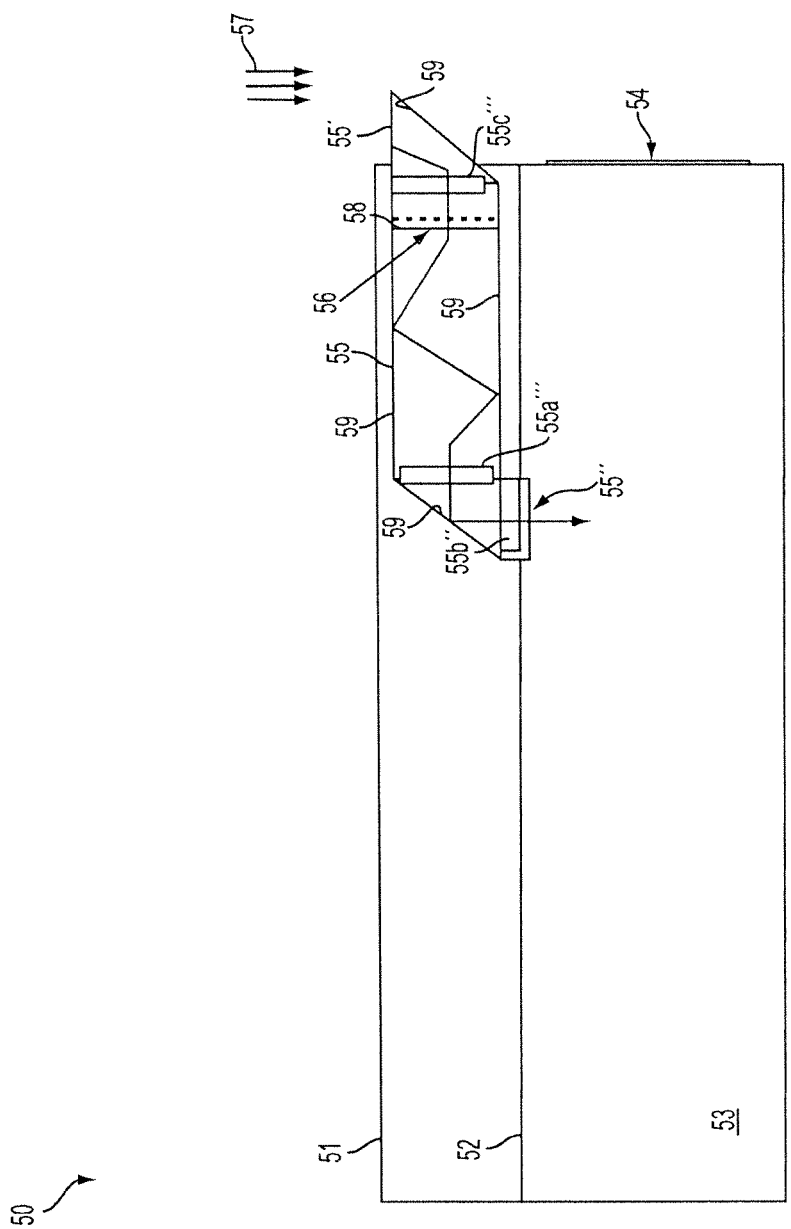
FIG. 5 shows another example using a tunnel-shaped daylighting device

The example in FIG. 5 is similar to that of FIG. 4A, but for the design of the entrance 55' of the daylighting device 55. The entrance 55' of the daylighting device 55 includes an additional prism or mirror member 55c' which allows light 57 to enter the daylighting device 55 of building 50. In the example of FIG. 5, the daylighting device 55 is positioned between the roof 51 and ceiling 52 with the entrance 55' of the daylighting device positioned on a side of the building 50. The daylighting device 55 extends horizontally from the side of the building to a desired position in the ceiling 52. Such designed daylighting devices are commercially available and referred to as a "solar pipe", "light pipe", "light tube" and "tubular skylight". Somewhat different or angled orientation of the device may be used. The tunnel shaped daylighting device 55 allows light 57 to enter the daylighting device at entrance 55' and follow the path of the directional arrow into interior room 53. The inner surfaces 59 of the daylighting device 55 may be reflective, e.g. specular, quasi-specular or diffusely reflective, to minimize losses as outlined earlier. The daylighting device 55 allows for the light entering the daylighting device and pass though a first prism or mirror member 55c'" and travel along a direction between the roof 51 and ceiling 52 until it reaches the prism or mirror members 55a'" and 55b'" which alter the direction of the light into the interior room 53. It should be noted that the prism or mirror members 55a'", 55b'" and 55c'" are optional members and can be omitted in an alternative example similar to that described for FIG. 4B.

The opto-luminescent material 56 performs in substantially the same manner as the examples in FIGS. 2 and 4. The daylighting device 55 includes an opto-luminescent structure 58 for bearing an opto-luminescent material 56 associated with the exterior surface 55'. The opto-luminescent material 56 has excitation and emission spectra so as to convert a first portion of light 57 in a first spectral region to light in a second spectral region. Thus, at least some of the light transported to the left of the depicted opto-luminescent structure 58 will contain light in a second spectral region. The opto-luminescent structure 58 is configured so that at least some of the light in the second spectral region produced by excitation of the opto-luminescent material 56 is emitted into the interior of the building 50 in combination together with a second portion of the light passing through the entrance surface 55'.

In the example of FIG. 5, the entrance 55' of the daylighting device 55 protrudes outward from the side of the building 50 to better capture of the daylight 57. Light 57 enters a substantially horizontal portion of the entrance and is reflected inward toward the interior of the building where light is reflected in towards the exit of the device 55 into the room 53. Other more round shapes or orientations may be used to effectively capture or collect light 57 for use in the daylighting device 55. Although not shown a color filter can be used in conjunction with or, as an alternative to the opto-luminescent material.

The window 54 can optionally include a window dressing such as a shade or blind (not shown) having an opto-luminescent material included therein, as discussed above for the example of FIG. 3A. Alternatively, or in combination with the window dressing, the opto-luminescent material 56 can be included in the material (glass, acrylic, etc.) of window 54.

Figure 6A:
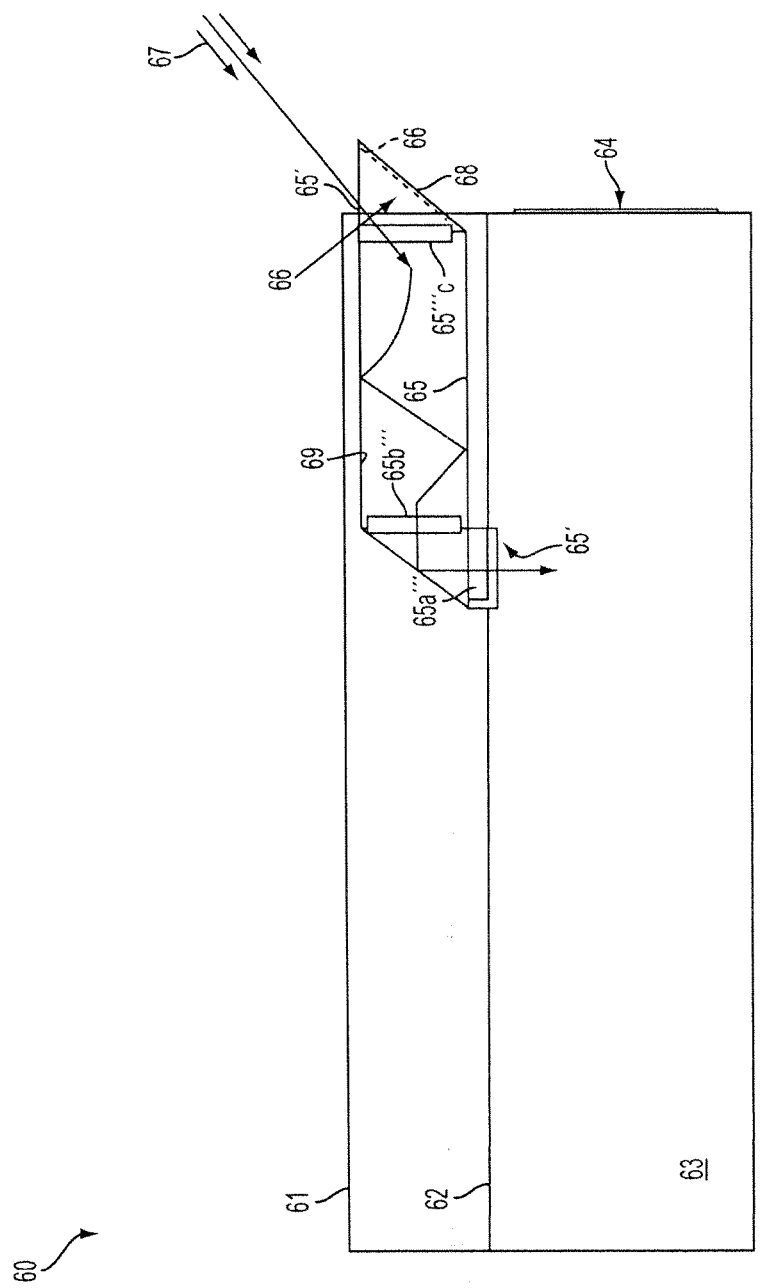
FIGS. 6A and 6B depict an example of a tunnel-shaped daylighting device in morning and afternoon natural light, respectively.
Figure 6B:
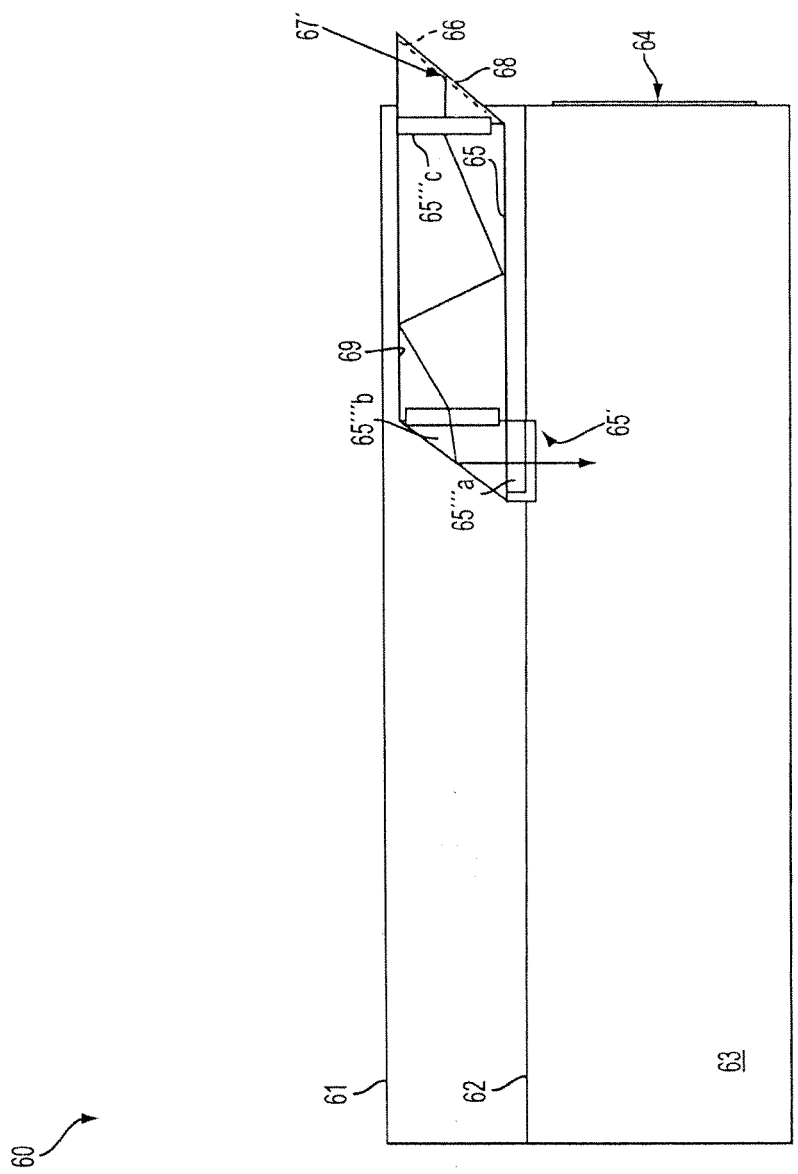

FIGS. 6A and 6B illustrate an alternative placement of the opto-luminescent material 66 in the daylighting device 65, which is otherwise similar to the device of FIG. 5. FIG. 6A shows morning light entering the daylighting device 65, whereas FIG. 6B shows afternoon light entering the daylighting device 65.

In this example (FIGS. 6A, 6B), the opto-luminescent material 66 is included on the opto-luminescent structure 68 adjacent to a side of the building 60. The daylighting device 65 is positioned between the roof 61 and ceiling 62 with the entrance 65' of the daylighting device positioned on a side of the building 60 to collect light 67. The daylighting device 65 extends in the example horizontally from the side of the building 60 to a desired position in the ceiling 62. The tunnel shaped daylighting device 65 allows light 67 to enter the daylighting device and follow the path of the directional arrow into interior room 63.

In the morning, the light 67 entering the daylighting device at the input of the opto-luminescent structure 68 is at an angle such that there is little or no excitation of the opto-luminescent material 66 by the light 67 (FIG. 6A). The color of light 67 is a warmer red in the morning; and therefore, there is no need to color correct the morning light entering the daylighting device 65. Thus, due to the low position of the sun in the sky, the angle of light entering the daylighting device does tends not to substantially excite the opto-luminescent material 66. The majority of the light 67 passes into the daylighting device 65 along the reflective tunnel shaped design and through prisms or mirrors 65a, b, c'" and into room 63 to illuminate 65' the interior of room 63. The inner surfaces 69 of the daylighting device 65 may be reflective, e.g. specular, quasi-specular or diffusely reflective, to minimize loss of light back out of the entrance 65' of the daylighting device 65.

In FIG. 6B, as the day progresses and the sun continues to rise from the horizon to its peak in the sky, the light 67' enters the daylighting device 65 at an angle sufficient to pump or excite the opto-luminescent material 66 positioned on the opto-luminescent structure 68. The cooler blue and green colored light entering the daylighting device 65 will excite the opto-luminescent material 66 and the color corrected light of a warmer appearance will then enter the daylighting device and pass through mirrors or prisms 65*a, b, c'''* before entering and illuminating 65" the interior of room 63.

Figure 7A:
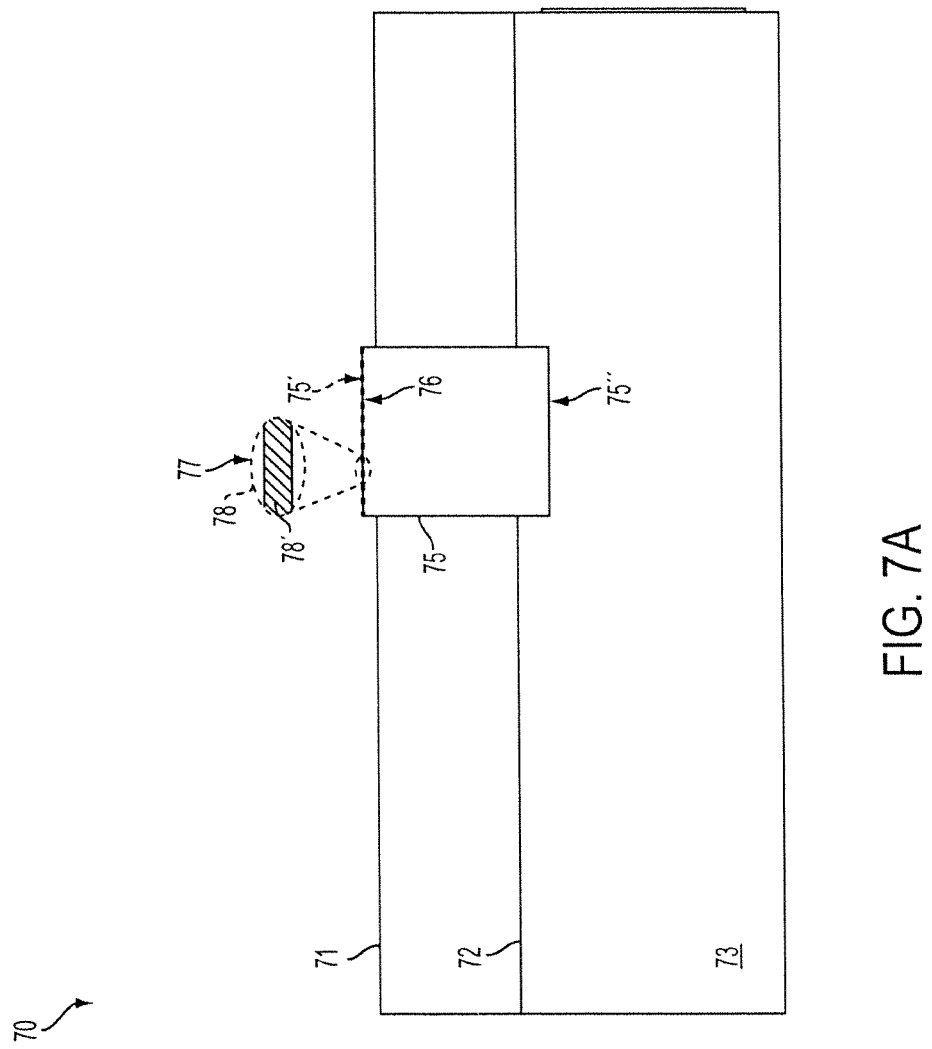
FIGS. 7A and 7B illustrate an example of a daylighting device in morning and afternoon natural light, respectively.
Figure 7B:
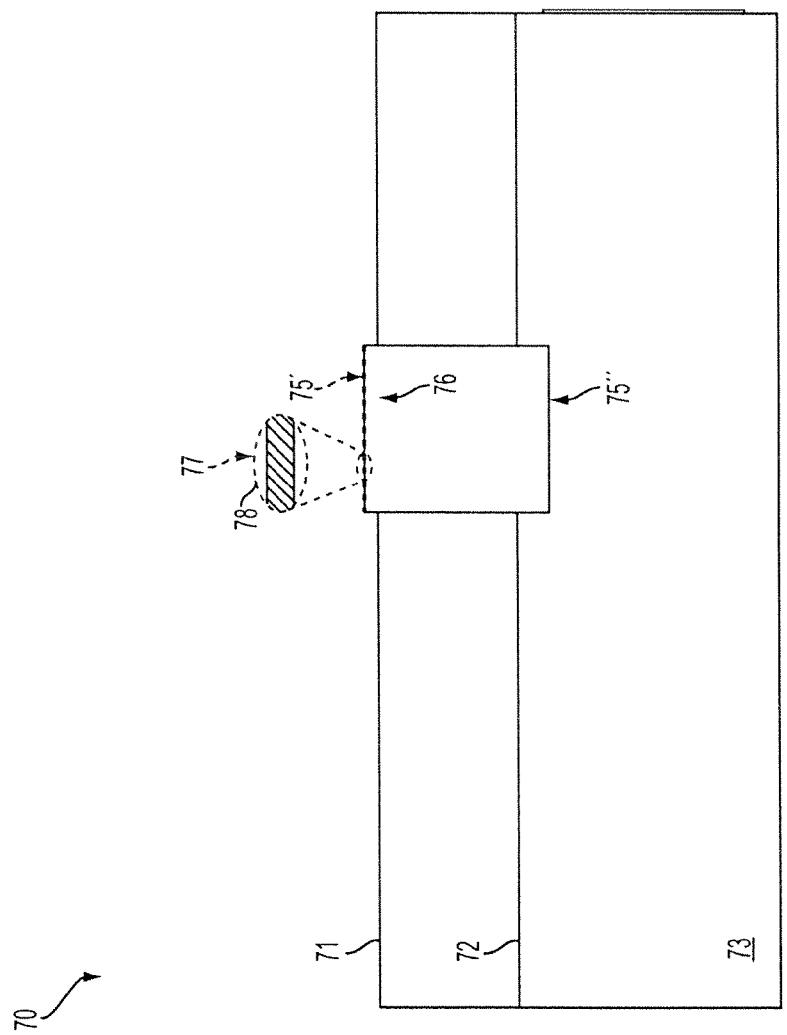

FIGS. 7A and 7B depict another example of a daylighting device 75, wherein the opto-luminescent material 76 is positioned at the entrance surface 75' of the daylighting device 75. The building 70 contains the daylighting device 75 that extends from the roof 71 into the ceiling 72 to provide illumination 75" to interior room 73. In this example, the device is vertical, although the device may be somewhat angled relative to vertical. FIG. 7A illustrates an example of morning light entering the daylighting device 75, whereas FIG. 7B shows an example of afternoon light entering the daylighting device 75.

In this example, the device 75 includes a micro-channel plate 78. The micro-channel plate 78 is a grating formed of a plurality of angled micro louver plates 78'. The material of the micro-channel plate is similar to that used in privacy filters for computer monitor screens. Commercially available micro louver control films are available. 3M manufactures Vikuiti™ Light Control Film which is a thin plastic film containing closely spaced micro louvers. The control film is cellulose acetate butyrate and is a transparent film. Instead of a black dye that is used in the Vikuiti™ Light Control Film to obscure or limit the viewing angle, it is replaced with a opto-luminescent dye. The opto-luminescent material 76 can be deployed as a dye or coating on, or embedded into, each angled micro louver plate 78' of the grating 78. Due to the angled micro louver plates 78' in this example, the morning light 77 entering the daylighting device 75 will have minimal contact with the opto-luminescent material 76 contained within or on the angled micro louver plates 78'. Therefore, a substantial amount of light 77 will pass through the daylighting device 75 and illuminate room 73 with minimal excitation of the opto-luminescent material 76. The opto-luminescent material 76, for example, can be applied as a coating, impregnated or doped within the micro-channel plate 78.

Turning now to FIG. 7B, as the day progresses and the sun continues to rise from the horizon to its peak in the sky, the light 77' enters the daylighting device 75 at an angle sufficient to pump or excite the opto-luminescent material 76 positioned on or in the micro-channel plate 78. The cooler blue and green colored light entering the daylighting device 75 will excite the opto-luminescent material 66 and the color corrected light will then enter the daylighting device before entering and illuminating 75" the interior of room 73. The remaining colors of light will pass through the micro-channel plate without exciting the opto-luminescent material 76.

In FIG. 7B, as the day progresses and the sun continues to rise from the horizon to its peak in the sky, the light 77' enters the daylighting device 75 at an angle sufficient to pump or excite the opto-luminescent material 66 positioned on or in the angled micro louver plates 78'. The cooler blue and green colored light entering the daylighting device 75 will excite the opto-luminescent material 76 and the color corrected light of a warmer appearance will then enter the daylighting device 75 and pass through the daylighting device before entering and illuminating 75" the interior of room 73. A color filter such as an absorption filter or reflective filter (not shown)n can be included in this example.

The example of FIG. 8 illustrates a shield 88 configured to retract over the opto-luminescent material 86. The shield 88 has a specular or mirrored surface and is mechanically adjustable either by an automated controller/processor or by user adjustment. The user can also adjust the shield 88 through a wall switch or remote control device associated with the controller/processor, or some mechanical adjustment member can be operated by the user to manually adjust the position of the shield 88. The daylighting device 85 in building 80 extends from the roof 81 and through the ceiling 82 to provide illumination 85" in interior room 83. The shield is adjustable throughout the day to help maintain a desired color temperature to illuminate room 83. For example, during morning hours or later afternoon hours that approach sunset, the shield can be positioned over the opto-luminescent material 86 such that the morning or late afternoon light will pass through the daylighting device 85 and illuminate interior room 83 without pumping or exciting the opto-luminescent material 86 hidden behind the shield 88. As the day progresses or weather conditions change (increase in cloud cover), the shield 88 can be adjusted (by user or automatically by a controller based on a preset color temperature selected by the user) such that the shield 88 can be retracted to expose the opto-luminescent material 86. The now exposed opto-luminescent material 86 can convert or color correct the afternoon light to a predetermined color temperature.

The concentration of the opto-luminescent material 86 can be varied to enable fine or course control of the desired color temperature while providing a large range of control. For example, a higher concentration of opto-luminescent material will color correct the natural light into a warmer colored light, typical of morning light or perhaps later afternoon light approaching sunset. Alternatively, the opto-luminescent density can be altered to provide a large range of control. In certain examples, different opto-luminescent material(s) can be used such that one or more different opto-luminescent materials are exposed by the shield 88 during different parts of the day or because of a change in weather conditions. For example one region of the structure bearing the opto-luminescent material could contain one or more opto-luminescent materials at one or more concentrations or density levels, whereas a second region of the structure could include other opto-luminescent material(s). It should be apparent that certain opto-luminescent materials may perform better at different times of the day or during certain weather conditions.

It is desirable to improve performance of the daylighting device to maximize opto-luminescent emissions into an interior room of a building. It is also desirable to prevent opto-luminescent emissions back in other directions besides the interior room. Thus, a directional light guide deflector can be implemented to redirect trapped light in a desired direction.

Figure 9B:
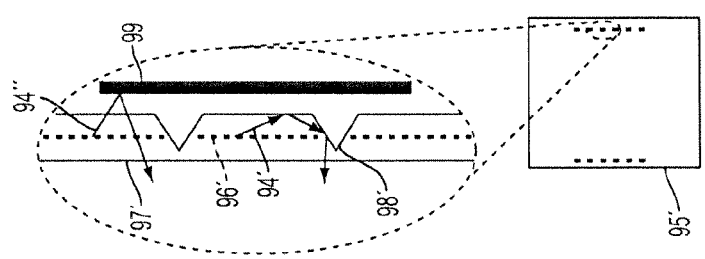
FIGS. 9A and 9B represent an example of a material containing an opto-luminescent material.
Figure 9A:
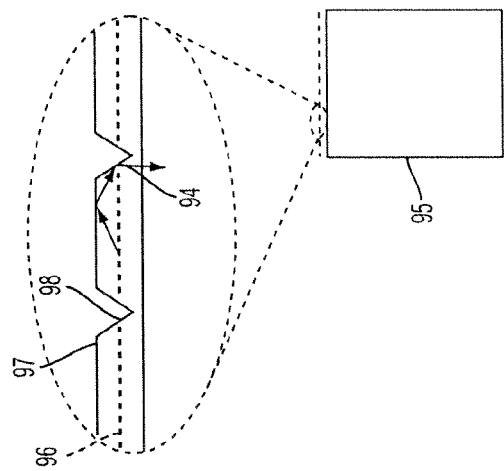

To this point, as shown in FIGS. 9A and 9B, the opto-luminescent material 96, 96' is contained in a film or sheet 97, 97'. The film or sheet 97, 97' serves as a layer for containing the opto-luminescent material 96, 96' therein. The film or sheet 97, 97' contains indentations or divots 98, 98' which serve as directional deflectors for pumped light 94, 94' trapped in the film or sheet 97, 97'. Thus, in the daylighting device 95, which is similar to that described above for FIG. 2, some of the pumped or excited light generated by the opto-luminescent material 96 can be trapped within the film or sheet 97 (or other container/structure housing the opto-luminescent material). The directional deflectors 98 redirect the trapped light 94 into the daylighting device, in the direction of the interior room, such as shown in one or more of the earlier examples. Thus, the emissions of the opto-luminescent material 96 can be maximized in the direction of the interior room.

Similarly with FIG. 9B, the daylighting device 95' which is similar to that described above for FIG. 8, some of the pumped or excited light generated by the opto-luminescent material 96' can be trapped within the film or sheet 97' positioned between the mirrored surfaces 99 and the shield (FIG. 8). The directional deflectors 98' redirect the trapped light 94' out of the film or sheet and into the daylighting device 95'. Thus, the emissions of the opto-luminescent material 96' can be maximized into the interior room. In FIG. 9B, any light 94" that escapes the film or sheet 97'in the direction of the specular or mirror surface 99 of the daylighting device 95', is redirected by the specular or mirror surfaces 99 towards into the daylighting device 95'. Accordingly, cooler blue and green colored light entering the daylighting device 95, 95' will excite the opto-luminescent material 96, 96' and the color corrected light of a warmer appearance will then enter the daylighting device 95, 95' and pass through the daylighting device 95, 95' before entering and illuminating an interior room of a building containing the daylighting device 95, 95'.

Fiber optics can also be used for color correction of daylighting. Commercially available optical fibers of most any variety can be used. Optical fibers manufactured by Corning Inc., are but one example. Optical fibers that include an input links that are transmissive light of a variety of wavelengths, including but not limited to ultraviolet light, are advantageous.

Figure 10:
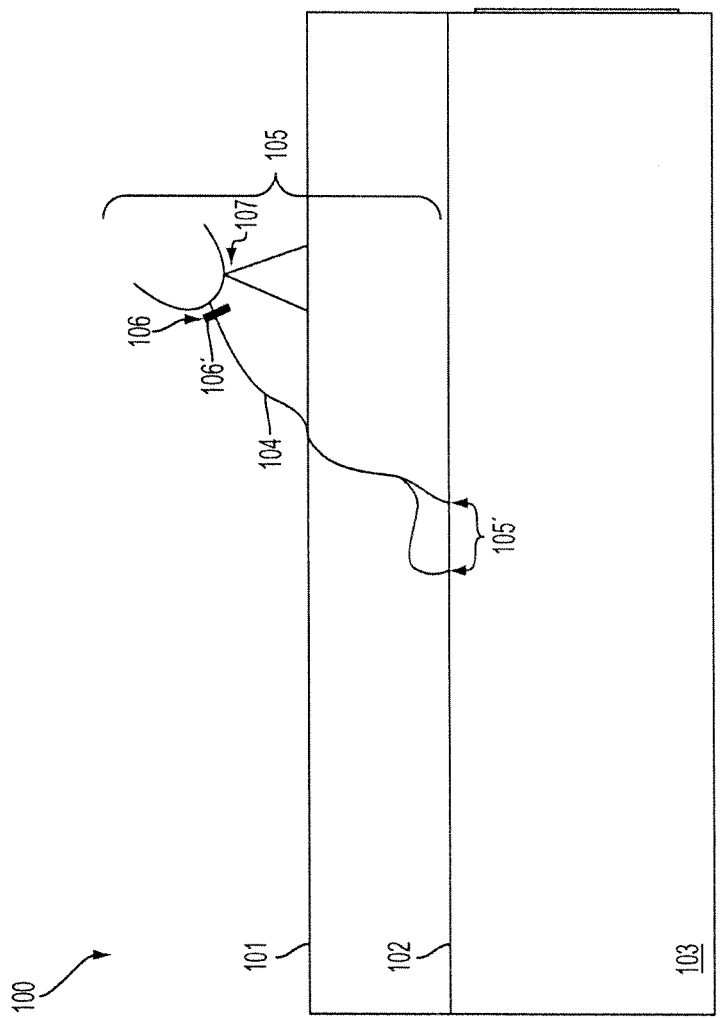
FIG. 10 shows another example of a daylighting device using fiber optics.

In the daylighting device 105 example shown in FIG. 10, one or more fiber optic cables 104 are associated with a solar collector 107 positioned on roof 101 of building 100. The fiber optic cable(s) 104 extend from the solar collector 107 down through the ceiling 102 to provide illumination 105' to interior room 103. The solar collector 107 in this example is configured to track the position of the sun and concentrate the sun's light by rotation and/or pivoting motion. The solar collector 107 is positioned for optimal tracking of the sun during daylight hours. It can be mounted on the exterior side of the building 100 rather than on the roof 101. The opto-luminescent material 106 which is concentrated in a container 106' is excited by light provided from the solar collector 107 and passed into the optical cable(s) 104 to provide the interior room with illumination 105'. The opto-luminescent material 106 can optionally include a control mechanism for actively or passively changing the spectral content of daylight of a particular spectral range that is captured by the solar collector 107.

Figure 11:
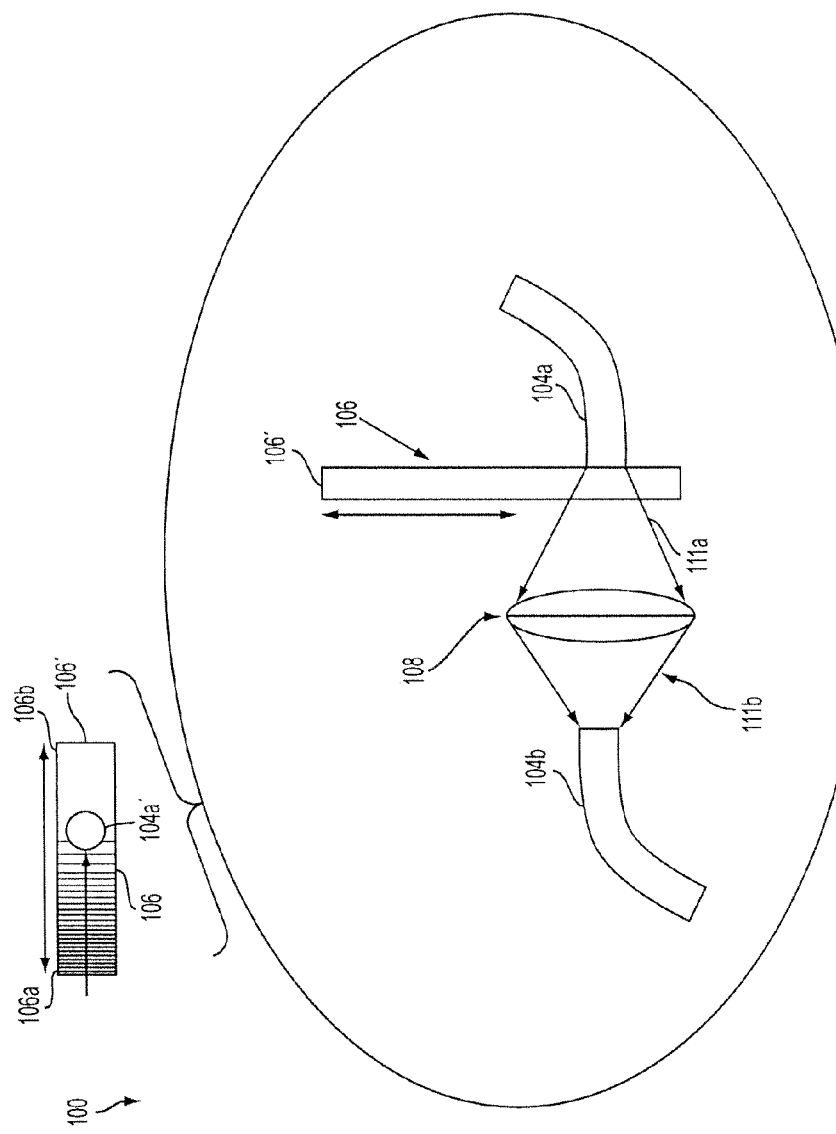
FIGS. 11 and 12 are more detailed views of the daylighting device of FIG. 10.
Figure 12:
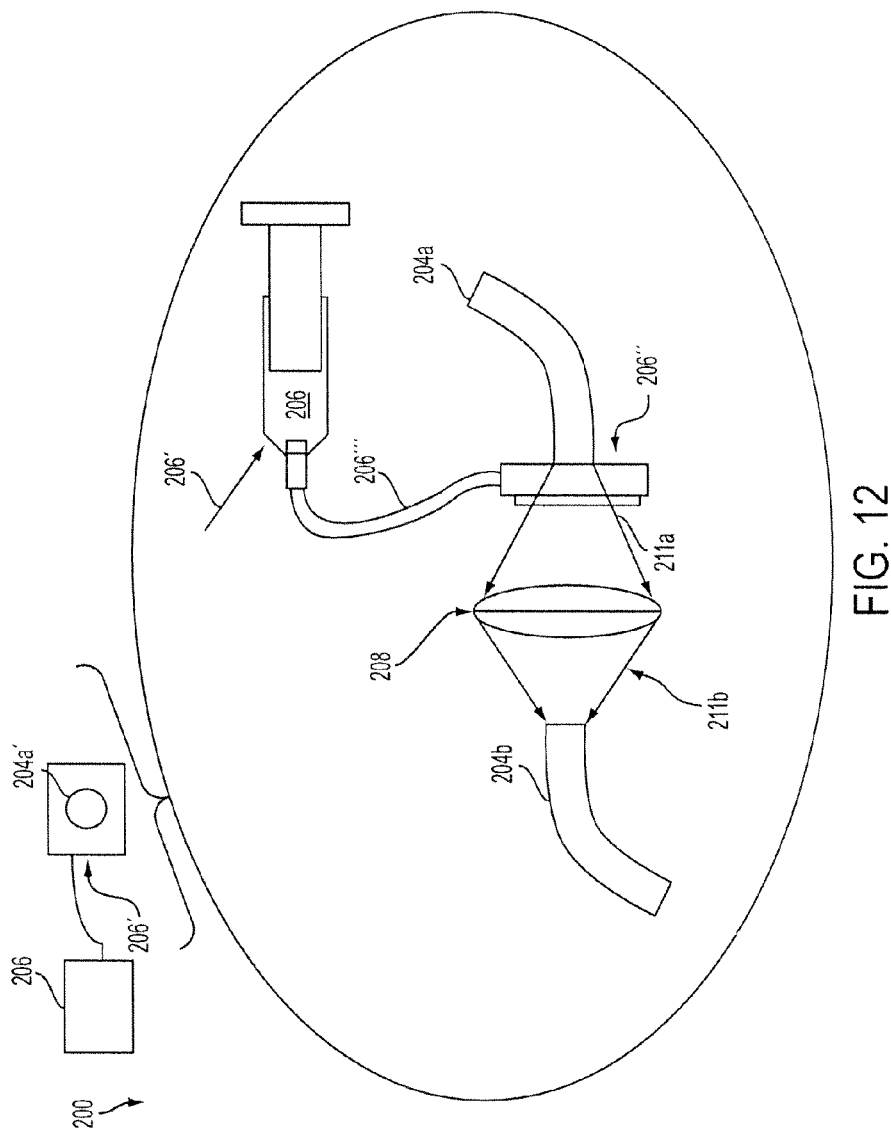

The daylighting device 105 can be adjusted to control the color temperature through a control mechanism associated with the daylighting device 105. Examples of such control mechanisms 100 and 200 are illustrated in FIGS. 11 and 12, respectively. In FIG. 11, a first portion of the optical cable 104*a* coming from a solar collector 105 (FIG. 10) has a fiber optic aperture 104*a*' positioned adjacent to a surface of the junction container 106' housing the opto-luminescent material 106. The opto-luminescent material 106 contained in the junction container 106' is more concentrated in region 106*a* than region 106*b*. The fiber optic aperture 104*a*' can be movably adjusted between regions 106*a* and 106*b* to control the color temperature. More than one optical fiber can be used and provide light to the interior of the building at more than one location. The higher the concentration of opto-luminescent material, the warmer the light output is from the container 106' along optical path 111*a* and into coupling lens 108. Light from the coupling lens 108 exits into the optical fiber 104*b* via optical path 111*b* which then proceeds to the interior room 103 (FIG. 10) along fiber optic cable 104.

The control mechanism 200 example in FIG. 12 includes a reservoir 206' (first reservoir) for dispensing an amount of opto-luminescent material 206 into a bladder capsule 206''' (second reservoir) by way of a connection 206'''. In FIG. 12, a first portion of the optical cable 204*a* coming from a solar collector 105 (FIG. 10) has a fiber optic aperture 204*a*' positioned adjacent to a surface of the bladder capsule 206" housing the opto-luminescent material 206. The opto-luminescent material is added into the bladder capsule based on the desired color temperature. The more opto-luminescent material 206 that is added to the bladder capsule 206", the warmer the light output from the bladder capsule 206" along optical path 211*a* and into coupling lens 208. Light from the coupling lens 208 exits into the optical fiber 204*b* via optical path 211*b* which then proceeds along into the interior room 103 (FIG. 10). If a cooler colored light is desired the amount of opto-luminescent material 206 is reduced and returned to the reservoir 206'.

With the control mechanisms 100 and 200 of FIGS. 11 and 12, respectively, the color temperature control can be adjusted by way of user control such as a wall switch or remote control in an interior room of the building (FIG. 10). Alternatively, the control mechanism 100, 200 can be set to a predetermined color and the control mechanism 100, 200 is automatically adjusted by way of a processing device or controller with associated power supply. The processing device or controller could be hard-wired logic or a programmed microprocessor with associated memory devices. Typically, the processing device is a Micro-Control Unit (MCU), which controls operations of the respective mechanisms 100, 200. The MCU may be a microchip device that incorporates a processor serving as the programmable central processing unit (CPU) of the MCU and thus of the control mechanisms 100, 200 of FIGS. 11 and 12 as well as one or more memories accessible to the CPU. The memory or memories store executable programming for the CPU as well as data for processing by or resulting from processing of the CPU. The MCU may be thought of as a small computer or computer like device formed on a single chip. Such devices are often used as the configurable control elements embedded in special purpose devices rather than in a computer or other general purpose device.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A daylighting device, comprising:
a passive optical element, that is at least substantially transmissive with respect to daylight, configured to receive daylight from outside a structure and allow passage of light to an interior of the structure; and
a material, comprising one or more phosphors, associated with the passive optical element, each phosphor being of a type to provide a Stokes or anti-Stokes wavelength shift from an excitation spectrum to an emission spectrum so as to convert a first portion of the received daylight in a first spectral region to light in a second visible spectral region, wherein:
at least some of the light in the second visible spectral region produced by excitation of the one or more phosphors of the material is combined together with a second visible portion of the daylight received through the passive optical element, and the combined light is emitted into the interior of the structure, and
the combination of the light produced by excitation of the one or more phosphors together with the second visible portion of daylight produces a change of a visible color characteristic of the light emitted by the device into the interior of the structure in relation to daylight received by the device, over at least a substantial portion of time while the device is receiving daylight.

2. The daylighting device of claim 1, wherein:
the daylighting device comprises a skylight, and
the material is positioned at an entrance to, exit from or internally within the skylight.

3. The daylighting device of claim 1, wherein:
the daylighting device comprises a skylight or sun-room roof, and
the material is a sheet or film.

4. The daylighting device of claim 1, wherein:
the daylighting device comprises a skylight or sun-room roof, and
the passive optical element comprises an entrance to the skylight or sun-room roof.

5. The daylighting device of claim 1, wherein the daylighting device comprises a window including a glass or plastic bearing the material.

6. The daylighting device of claim 5, wherein the material is:
applied as a coating on one or more surfaces of the glass or plastic;
doped or impregnated into the glass or plastic; or
present as a gas dispersed between two glass or plastic members of the window.

7. The daylighting device of claim 1, wherein the material is contained in or on a window dressing selected from a shade, curtain or blind.

8. The daylighting device of claim 1, further comprising a color filter for filtering one or more colors of light from the daylight.

9. The daylighting device of claim 1, further comprising a collector positioned adjacent to the passive optical element for collecting the daylight.

10. The daylighting device of claim 1, wherein each of the one or more phosphors is a phosphor selected from the group consisting of: rare earth phosphor, semiconductor nano-phosphor, and doped semiconductor nano-phosphor.

11. The daylighting device of claim 1, further comprising one or more prisms, mirrors or optical devices for directing the daylight and/or light of the first and second spectral regions towards the interior of the structure.

12. The daylighting device of claim 1, further comprising specular reflective walls for reflecting the daylight and/or light of the first and second spectral regions towards the interior of the structure.

13. The daylighting device of claim 1, wherein the material is included in or on a micro-channel plate comprising a plurality of angled micro louver plates for receiving the daylight.

14. The daylighting device of claim 1, further comprising:
a shield positioned adjacent to the material,
wherein the shield is configured to move from a first position to block the material from receiving the daylight, to a second position to expose the material such that it receives the daylight.

15. The daylighting device of claim 14, wherein the shield is mechanically adjustable by way of a user or automatically adjustable by a controller or processor.

16. The daylighting device of claim 1, wherein the material is contained in or on a sheet or film including a plurality of directional deflectors for redirecting light in the second spectral region that is trapped within the sheet or film out of the film or sheet into the daylighting device.

17. The daylighting device of claim 1, wherein the one or more phosphors are of a type such that the light conversion and combination results in a reduced variation in color characteristic of light supplied through the device into the interior of the structure due to variations over time or conditions in the color characteristic of the daylight.

18. The daylighting device of claim 1, wherein the change of the visible characteristic comprises a change of one or more of Correlated Color Temperature (CCT), Duv (the closest distance from the Plankian locus), Color Rendering Index average (CRI Ra), and red rendering index (R9).

19. A daylighting method, comprising steps of:
receiving daylight from outside a structure, for transmission through a passive optical element toward an interior of the structure, the element being at least substantially transmissive and color neutral with respect to daylight;
exciting one or more phosphors with a first portion of the received light in a first spectral region. each phosphor of a type to provide a Stokes or anti-Stokes wavelength shift from an excitation spectrum to an emission spectrum, so as to convert the first portion of the light into light in a second visible spectral region; and
supplying a combination of at least some of the light in the second visible spectral region produced by the excitation of the one or more phosphors and a second visible portion of the received daylight through the passive optical element, into the interior of the structure,
wherein the combination of the light produced by excitation of the one or more phosphors together with the second visible portion of daylight produces a change of a visible color characteristic of light supplied through the passive optical element into the interior of the structure in relation to received daylight, over at least a substantial portion of time while receiving daylight.

20. The method of claim 19, wherein each of the one or more phosphors is a phosphor selected from the group consisting of: rare earth phosphor, semiconductor nano-phosphor, and doped semiconductor nano-phosphor.

21. The method of claim 19, wherein the receiving step includes receiving daylight having a color temperature in a range of about 5,000 to 5,600° K.

22. The method of claim 21, wherein the combined light emitted into the interior of the structure has a color temperature in a range of about 3,000 to 3,500° K.

23. The method of claim 19, wherein the one or more phosphors are of a type such that the light conversion and combination results in a reduced variation in color characteristic of light supplied through the device into the interior of the structure due to conditions or variations over time in the color characteristic of the daylight.

24. The method of claim 19, wherein the change of the visible color characteristic comprises a change of one or more of Correlated Color Temperature (CCT), Duv (the closest distance from the Plankian locus), Color Rendering Index average (CRI Ra), and red rendering index (R9).

25. A system, comprising
a daylighting device, comprising:
(a) an optical collector for receiving daylight from outside a structure;
(b) an optical emitter element configured to allow passage of light to an interior of the structure; and
(c) an optical channel coupled to and configured to carry light from the optical collector to the optical emitter element; and
a material in or coupled to the daylighting device, wherein:
the material comprises one or more phosphors,
each of the one or more phosphors is of a type to provide a Stokes or anti-Stokes wavelength shift from an excitation spectrum to an emission spectrum so as to convert a first portion of daylight received by the system in a first spectral region to light in a second visible spectral region,
the material is positioned so that at least some of the light in the second visible spectral region produced by excitation of the material is emitted into the interior of the structure in combination together with a second visible portion of the received daylight, and
the combination of the light produced by excitation of the one or more phosphors together with the second portion of daylight produces a change of a visible color characteristic of the light emitted by the system into the interior of the structure in relation to daylight received by the system, over at least a substantial portion of time while the device is receiving daylight.

26. The system of claim 25, wherein each of the one or more phosphors is selected from the group consisting of: rare earth phosphor, semiconductor nano-phosphor, and doped semiconductor nano-phosphor.

27. The system of claim 25, wherein the optical collector is configured for positioning on an exterior of the structure and for active tracking of the daylight from outside the structure.

28. The system of claim 25, wherein the optical emitter is configured for positioning in a ceiling of an interior room of the structure to provide illumination to the room.

29. The system of claim 25, wherein the optical channel comprises one or more optical fibers extending from the optical collector to the optical emitter.

30. The system of claim 25, wherein:
the system further comprises a container for housing the material, and
a first side of the container includes a higher concentration of material than a second side of the container.

31. The system of claim 30, wherein:
the optical channel comprises one or more optical fibers, and
an optical aperture of each optical fiber is configured to be movably adjusted from the first side of the container to the second side of the container.

32. The system of claim 25, further comprising:
first and second reservoirs for housing the material, wherein:
the optical channel comprises one or more optical fibers,
an optical aperture of each optical fiber is adjacent to the second reservoir, and
the second reservoir is configured to pass the light in the second spectral region along an optical path of the one or more optical fibers in a direction towards the interior of the structure.

33. The system of claim 32, wherein:
the first reservoir supplies the material to the second reservoir, and
an amount of the material in the second reservoir determines a color temperature of the combined light emitted into the interior of the structure.

* * * * *